Feb. 13, 1962     L. P. POST ETAL     3,020,707
ENGINE EXHAUST MANIFOLD CONSTRUCTION
Filed Dec. 7, 1960     2 Sheets-Sheet 1
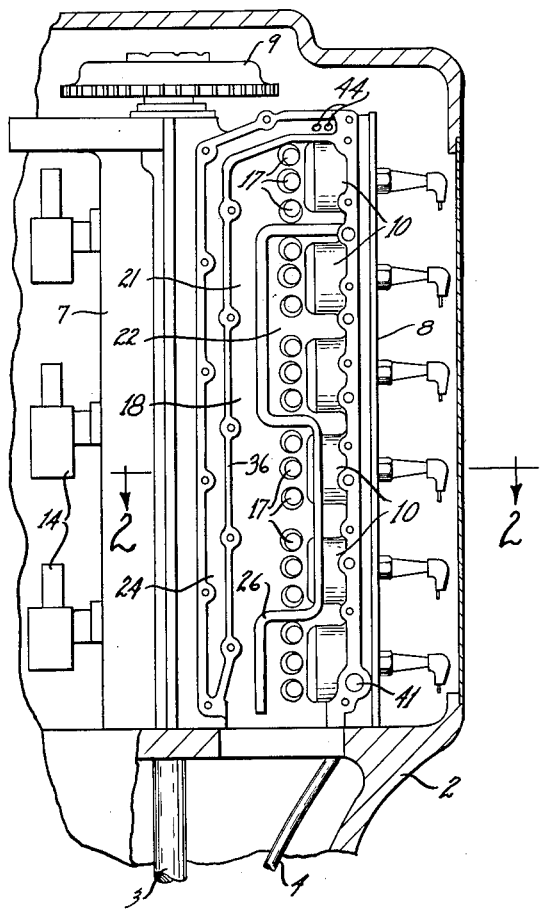
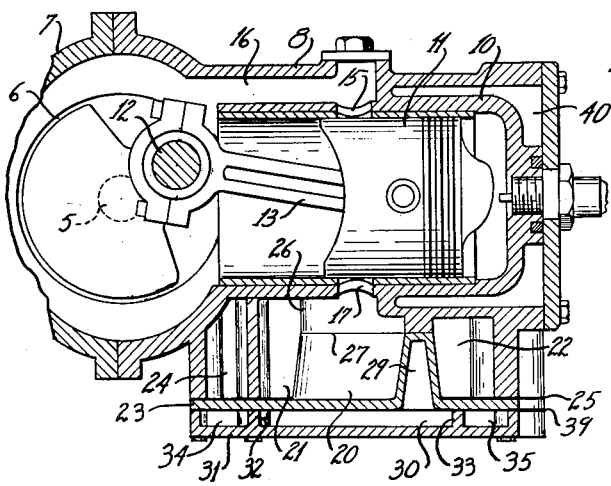
INVENTORS
LLOYD P. POST
ROBERT J. SHANAHAN
BY
Andrus & Starke
Attorneys

INVENTORS
LLOYD P. POST
ROBERT J. SHANAHAN 3,020,707
ENGINE EXHAUST MANIFOLD CONSTRUCTION
Lloyd P. Post, Fond du Lac, and Robert J. Shanahan, Oshkosh, Wis., assignors to Kiekhaefer Corporation, Cedarburg, Wis., a corporation of Wisconsin
Filed Dec. 7, 1960, Ser. No. 74,248
5 Claims. (Cl. 60—31)

This invention relates to the exhaust manifold structure for a two-cycle, internal-combustion engine having a bank of cylinders disposed in line.

Exhaust manifolding baffles for two-cycle, internal-combustion engines having a plurality of cylinders arranged in line are frequently cast integrally with the cylinder block within the exhaust cavity formed in the block. During operation of the engine, the heat of the exhaust gases gives rise to thermal stresses in the baffle which may cause distortion of engine block including the baffle itself. In those instances where the integral baffle structure is water cooled, distortion thereof may give rise to undesirable leakage of the coolant into the exhaust cavity. It is generally an object of this invention to provide an exhaust manifolding structure wherein the baffle is free to move independently of the cylinder block and thus eliminate the above noted problems.

According to this invention, the exhaust ports of a plurality of in line cylinders open into a common exhaust cavity formed in the cylinder block of a two-cycle engine. The cylinders have a given firing order wherein the exhaust period of one cylinder overlaps the exhaust period of the next firing cylinder. A closure member overlies the exhaust cavity of the cylinder block to close the cavity and is disposed oppositely from the cylinder exhaust ports. A baffle is formed integrally with the closure member and extends into the cavity to divide the cavity into a pair of adjacent chambers to separate the exhaust ports of the respective cylinders and thereby provide for alternation of exhaust discharges between the chambers. In accordance with the structure of this invention, the exhaust manifold baffle is free to move independently of the cylinder block by reason of the thermal stresses imposed thereon and thus avoids possible distortion of the block.

The drawings furnished herewith illustrate the best mode for carrying out the invention as presently contemplated and set forth hereinafter.

In the drawings:

FIG. 1 is a side elevation of a six-cylinder, two-cycle, internal-combustion engine with parts removed to show part of the exhaust manifolding structure of this invention;

FIG. 2 is an enlarged partial section taken on line 2—2 of FIG. 1;

Figure 3:
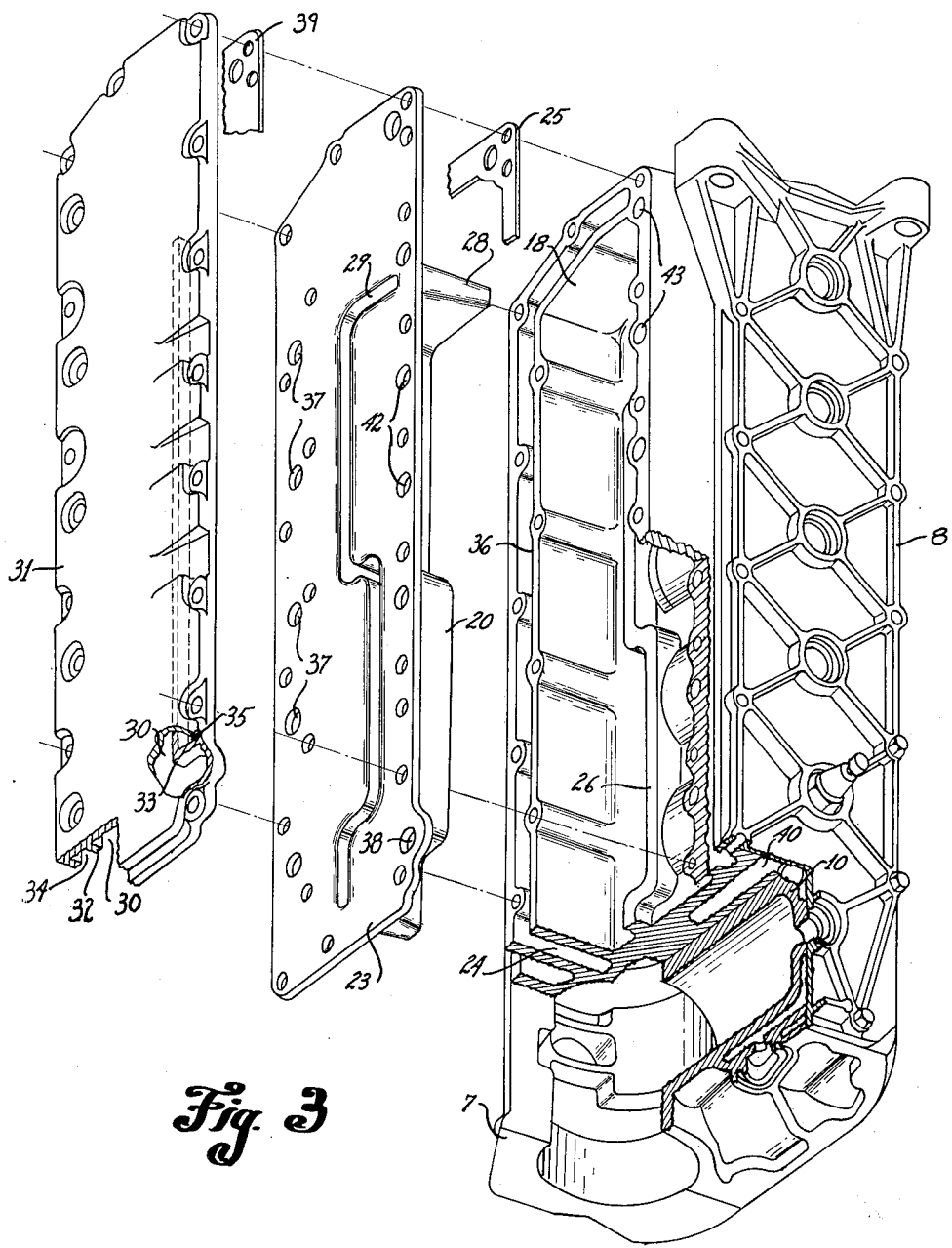
FIG. 3 is an exploded perspective view with parts broken away and sectioned and shows the structural details of the exhaust manifold structure and the mode of assembly onto the cylinder block of the engine.

The two-cycle, internal-combustion engine 1 shown in the drawings, and as may be employed in an outboard motor, not shown, is mounted on a housing 2 enclosing a drive shaft 3 and coolant supply conduit 4. The engine crankshaft 5 is enclosed and supported within the engine crankcase 6 formed between the crankcase member 7 and the cylinder block 8 and is drivingly connected to the drive shaft 3 at one end thereof and carries a flywheel 9 at the other end.

The cylinder block 8 is provided with six cylinders 10 disposed in line which open into the crankcase 6 and carry pistons 11 connected to the respective cranks 12 of the crankshaft 5 by the connecting rods 13.

The fuel mixture is supplied by the carburetors 14 to individual crank chambers of the crankcase 6 corresponding to the respective cylinders 10. In accordance with two-cycle operation of the engine, the fuel charge in the crank chamber is precompressed during the down-stroke of the piston 11 and while the intake ports 15 in the corresponding cylinder 10 remain closed or covered by the piston. The ports 15 are opened or uncovered by the piston 11 at the lower end of its stroke to allow the precompressed fuel charge to be transferred from the crank chamber to the corresponding cylinder 10 through passage 16 formed in the side of the cylinder block 8.

The exhaust ports 17 for each cylinder 10 are disposed oppositely from the intake ports 15 and are opened by pistons 11 at the lower end of its stroke to provide for exhaust of the cylinders. The exhaust ports 17 of the respective cylinders 10 open into a common exhaust cavity 18 formed in one side of the cylinder block 8. The exhaust products are conducted from the cavity 18 to the housing 2 through opening 19 provided therebetween.

The cylinders 10 of engine 1 have a given firing order and since there are six cylinders, the firing of the cylinders will be spaced 60° apart with respect to rotation of the crankshaft 5. The exhaust period of the respective cylinders 10 is somewhat longer than 60° so that the exhaust period of any given cylinder will overlap and interfere with the exhaust period of the next firing cylinder.

Interference between the overlapping exhaust periods of successively firing cylinders is prevented by the wall or baffle 20 disposed in exhaust cavity 18. The baffle 20 divides cavity 18 into a pair of adjacent chambers 21 and 22 and separates the exhaust ports 17 of the respective cylinders 10 in accordance with the firing order of the cylinders to provide for alternation of exhaust discharges between the chambers. The configuration of baffle 20 as shown in the drawings will provide the desired alternation of exhaust discharges between the respective chambers 21 and 22 for a given firing order of cylinders 10. For a different firing order of the cylinders 10, the configuration of baffle 20 may vary from that shown in the drawings to attain the desired result.

In accordance with this invention, the baffle 20 extending into exhaust cavity 18 is formed integrally with the closure plate member 23 which extends over and closes the cavity and the coolant passage 24 formed in block 8 adjacent to chamber 21 of the cavity. A suitable sealing gasket 25 is interposed between the closure member 23 and the block 8.

The inner edge of baffle 20 is adapted to engage the outer edge of a ridge 26 having the same configuration as the baffle and formed integrally with the block at the base of cavity 18. The engagement between baffle 20 and ridge 26 is on a planar parting line 27 adapted to substantially seal chambers 21 and 22 from each other when closure member 23 is secured in position. Engagement between the end edge 28 of baffle 20 and the corresponding wall of cavity 18 is also adapted to substantially seal chambers 21 and 22 from each other to prevent exhaust leakage therebetween.

In view of the relatively high temperatures of the exhaust products, provision is made for extensive cooling around exhaust cavity 18. As shown most clearly in FIG. 2, the baffle 20 is provided with a generally V-shaped cross-section having a coolant circulating recess 29 therein which opens outwardly into the coolant passage 30 formed oppositely from the exhaust ports 17 between the closure member 23 and the cover plate 31 which is spaced from the closure member intermediate its edges. Coolant passage 30 extends between ribs 32 and 33 which are spaced inwardly from the respective longitudinal edges of the cover plate 31 and are formed integrally with the cover plate.

The ribs 32 and 33 extend inwardly from cover plate 31 and engage the opposed surface of closure plate member 23 to form further coolant passages 34 and 35 respectively on opposed sides of passage 30. The rib 32 is contoured similarly and generally aligned with the wall 36 which separates the exhaust chamber 21 from coolant passage 24 in the block 8 and a plurality of spaced openings 37 formed in closure plate member 23 place the passages 24 and 34 in communication with each other. As shown most clearly in FIG. 3, the rib 33 has a generally L-shaped configuration with the relatively short laterally extending leg being generally disposed adjacent to and above opening 38 in closure member 23 as viewed in FIG. 3 to place the opening 38 in communication with passage 30. The longitudinally extending leg of rib 33 extends upwardly generally to the side of baffle recess 29 opposite from rib 32 and terminates generally at the laterally extending portion of the baffle recess closed by the end edge 28. Thus, coolant passages 30 and 35 are in communication with each other beyond the longitudinal terminus of rib 33. A suitable sealing gasket 39 is interposed between cover plate 31 and the closure member 23 and bolts extending through the cover plate and closure member secure the assembly to the block 8.

Further cooling of the exhaust products in cavity 18 is effected by coolant circulating around the dome of cylinders 10 in passage 40 formed in block 8 and which extends beneath a substantial portion of the base of the cavity.

In engine 1, coolant under pressure flows through supply conduit 4 which is connected to the opposed end, not shown, of passage 41 formed in the block 8. The coolant flows through passage 41 and the aligned opening 38 of closure member 23 into the coolant passage 30 and baffle recess 29. Thus, in its coolest state the coolant is first circulated over those surfaces of the exhaust manifold which, because of their location opposite to and adjacent the exhaust ports 17, tend to heat up most. From passage 30 the coolant, now somewhat heated, flows into passage 35. Thereafter, the coolant flows through longitudinally spaced openings 42 in closure member 23 and the aligned passages 43 formed in the block and circulates through the cylinder dome passage 40. From the cylinder dome passage 40, the coolant moves through passages 44 connecting the dome passage with coolant passage 24 and circulates in the connected coolant passages 24 and 34. Thereafter, the coolant may be circulated elsewhere in the block 8 if desired, or drained into the housing 2.

The exhaust manifold construction of this invention, wherein the baffle 20 is formed integrally with the closure member 23, avoids the possibility of distortion of engine block 8 by reason of thermal stresses in the baffle. In this construction the baffle 20 is free to move relative to the block 8 as a result of expansion and contraction of the baffle. The provision of a planar parting line between the baffle 20 and the ridge 26 on block 8 in cavity 18 generally assures that any such movements will not seriously disturb the seal therebetween and impair the functioning of the manifold. A baffle 20 formed integrally with closure member 23 also provides the further advantage of having a coolant recess 29 formed without parting lines so that the possibility of coolant leakage from the baffle into the exhaust chambers 21 and 22 is eliminated.

Various modes of carrying out the invention are contemplated as being within the scope of the following claims particularly pointing out and distinctly claiming the subject matter which is regarded as the invention.

We claim:

1. In a two-cycle internal-combination engine having a cylinder block with a plurality of cylinders disposed in line and an exhaust cavity in the block to one side of the cylinders, said cylinders having a given firing order wherein the exhaust period of one cylinder overlaps the exhaust period of the next firing cylinder and each cylinder having at least one exhaust port opening into the exhaust cavity, a closure member disposed oppositely from the cylinder exhaust ports and overlying the exhaust cavity of the cylinder block to close the cavity, said member having a baffle formed integrally therewith and extending into the cavity and dividing the cavity into a pair of adjacent chambers each having the respective exhaust ports of a corresponding group of cylinders opening thereinto, said groups of cylinders having alternating exhaust periods with the baffle serving to prevent interference in the exhaust periods of consecutively firing cylinders, an outer member overlying the closure member and spaced therefrom intermediate the edges thereof to form a coolant passage therebetween opposite from the exhaust ports, coolant supply means for said passage, coolant discharge means for said passage, and exhaust conduit means connected to the block and adapted to receive the discharges of exhaust gases from the adjacent chambers of the exhaust cavity.

2. The invention as set forth in claim 1 wherein the baffle on the closure member is provided with a coolant recess which opens into the coolant passage formed between the closure member and the outer member overlying the closure member.

3. In a two-cycle internal-combustion engine having a cylinder block with a plurality of cylinders disposed in line and an exhaust cavity in the block to one side of the cylinders, said cylinders having a given firing order wherein the exhaust period of one cylinder overlaps the exhaust period of the next firing cylinder and each cylinder having at least one exhaust port opening into the exhaust cavity, an outwardly extending ridge formed integrally with the cylinder block at the base of the exhaust cavity and partially dividing the cavity into a pair of adjacent chambers, each of said chambers having the respective exhaust ports of a corresponding group of cylinders opening thereinto and said groups of cylinders having alternating exhaust periods, a closure member overlying the exhaust cavity of the cylinder block to close the cavity and disposed oppositely from the cylinder exhaust ports, said member having a baffle formed integrally therewith and extending into the cavity, said baffle having a configuration corresponding to that of the ridge, and said ridge and baffle being engaged along a planar parting line to substantially seal the chambers from each other when the closure member is secured in position to prevent interference in the exhaust periods of consecutively firing cylinders, an outer member overlying the closure member and spaced therefrom intermediate the edges thereof to form a coolant passage therebetween opposite from the exhaust ports, coolant supply means for said passage, coolant discharge means for said passage, and exhaust conduit means connected to the block and receiving the discharges of exhaust gases from the adjacent chambers of the exhaust cavity.

4. The invention as set forth in claim 3 wherein the baffle on the closure member is provided with a coolant recess which opens into the coolant passage formed between the closure member and the outer member overlying the closure member.

5. In a two-cycle internal-combustion engine having a cylinder block with a plurality of cylinders disposed in line and an exhaust cavity in the block to one side of the cylinders, said cylinders having a given firing order wherein the exhaust period of one cylinder overlaps the exhaust period of the next firing cylinder and each cylinder having at least one exhaust port opening into the exhaust cavity, an outwardly extending ridge formed integrally with the cylinder block at the base of the exhaust cavity and partially dividing the cavity into a pair of adjacent chambers, each of said chambers having the respective exhaust ports of a corresponding group of cylinders opening therein and said groups of cylinders having alternating exhaust periods, a closure member overlying the exhaust cavity of the cylinder block to close the cavity and disposed oppositely from the cylinder exhaust ports, said member having a baffle formed integrally therewith and extending into the cavity, said baffle having a configuration corresponding to that of the ridge, and said ridge and baffle being engaged along a planar parting line to substantially seal the chambers from each other when the closure member is secured in position to prevent interference in the exhaust periods of consecutively firing cylinders, and exhaust conduit means connected to the block and receiving the discharges of exhaust gases from the adjacent chambers of the exhaust cavity.

References Cited in the file of this patent

UNITED STATES PATENTS

| | | |
|---|---|---|
| 2,067,253 | Wohanka | Jan. 12, 1937 |
| 2,423,602 | Magdeburger | July 8, 1947 |
| 2,455,493 | Jacobs | Dec. 7, 1948 |
| 2,504,973 | Gehres | Apr. 25, 1950 |
| 2,506,271 | Kiekhaefer | May 2, 1950 |